(12) United States Patent
Cougnard et al.

(10) Patent No.: US 6,466,621 B1
(45) Date of Patent: Oct. 15, 2002

(54) VIDEO CODING METHOD AND CORRESPONDING VIDEO CODER

(75) Inventors: Cécile Cougnard, Caen; Denis Roche, Boissy-Saint-Leger, both of (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/531,687

(22) Filed: Mar. 20, 2000

(30) Foreign Application Priority Data

Mar. 26, 1999 (EP) .......................................... 99400749

(51) Int. Cl.$^7$ ............................................... H04N 7/12
(52) U.S. Cl. ............................. 375/240.1; 325/240.03
(58) Field of Search .................. 375/240.02, 240.03, 375/240.05, 240.1, 240.12, 240.13; 348/397.1, 400.1, 411.1, 413.1, 416.1, 419.1, 425.3, 426.1, 441, 446; 382/234, 236, 238

(56) References Cited

U.S. PATENT DOCUMENTS

| | | | | |
|---|---|---|---|---|
| 5,436,663 A | | 7/1995 | Guede | 348/400 |
| 5,500,677 A | * | 3/1996 | Fert | 348/402 |
| 5,686,963 A | * | 11/1997 | Uz et al. | 348/404 |
| 5,878,166 A | * | 3/1999 | Legall | 382/232 |
| 6,097,757 A | * | 8/2000 | Boice et al. | 375/240 |
| 6,205,174 B1 | * | 3/2001 | Fert et al. | 375/240.03 |
| 2001/0000704 A1 | * | 5/2001 | Fert et al. | 375/240.16 |
| 2001/0021220 A1 | * | 9/2001 | Fert et al. | 375/240.03 |

FOREIGN PATENT DOCUMENTS

| | | | |
|---|---|---|---|
| WO | WO9907158 | 11/1999 | H04N/7/50 |
| WO | WO9907159 | 11/1999 | H04N/7/50 |

OTHER PUBLICATIONS

"MPEG Video Coding: A Tutorial Introduction", By S.R. Ely, BBC Research and Development Report, BBC–RD–1996/3.
EP 0940042 (PHF 98524).
EP 0603947 (PHF 92570).

* cited by examiner

Primary Examiner—Vu Le
(74) Attorney, Agent, or Firm—Russell Gross

(57) ABSTRACT

The invention relates to a video coding method based on an adaptive frame/field encoding mode. In order to avoid an impairment of the image quality and of the compression efficiency when a video sequence comprises a lot of motion or on the contrary quasi-motionless images, an improved real time double pass encoding scheme is proposed: during the first pass, no video stream is generated, but statistical results are computed and then provided to the second pass in order to optimize during said second pass the bit rate allocation and the buffer management. This improved double pass encoding method leads to an increase of the compression efficiency of about 10%.

1 Claim, 3 Drawing Sheets

VIDEO CODING METHOD AND CORRESPONDING VIDEO CODER

FIELD OF THE INVENTION

The present invention relates to a method for coding a sequence of video pictures, comprising at least an analysis step, including a first converting sub-step for converting the current picture into a sequence of macroblocks followed by a first pass encoding sub-step, and a final coding step, including a similar second converting sub-step followed by a second pass encoding sub-step at the end of which an output coded video bitstream is generated which may be used, for instance, for coding a sequence of pictures according to an image coding standard such as MPEG-2. The invention also relates to a video coder for implementing said coding method.

BACKGROUND OF THE INVENTION

The goal of MPEG is to define a standard for digital compression of video (and audio) signals. The basic principles of this standard are described in the document "MPEG video coding: a tutorial introduction", by S. R. Ely, BBC Research and Development Report, BBC-RD-1996/3. A first generation of video encoders used single-pass encoding. Nowadays, some encoders use at least dual-pass encoding. According to such an encoding mode, each picture is coded twice: a first pass, at the end of which no video stream is generated, allows to collect statistical results and to code with a better quality the same current picture during a second pass, at the end of which the output coded video stream is generated. A greater number of passes may be provided, as observed for instance in the video coder described in the document EP 0940042 (PHF98524), in which, according to FIG. 1, one or several analysis passes AP allow to adjust some coding parameters before implementing, after a prediction step PS, a final coding pass CP.

It is known that the MPEG-2 standard allows to code interlaced pictures, i.e. pictures composed of two interlaced fields. As described in the document EP 0603947 (PHF92570), said pictures can be encoded at the macroblock level according either to a frame encoding mode or to a field encoding one, on the basis of a predefined criterion. However, none of these two solutions is optimal: impairment of the displayed image quality and of the compression efficiency is observed when a picture sequence comprising a lot of motion is frame encoded or, on the contrary, when a quasi motionless sequence is field encoded.

SUMMARY OF THE INVENTION

It is therefore an object of the invention to propose an improved coding method with which the cited drawback is avoided.

To this end, the invention relates to a method such as defined in the introductive paragraph of the description and which is moreover characterized in that statistical results are derived from said first pass encoding sub-step, coding decisions being then provided to the second pass encoding sub-step according to predetermined criteria related to said statistical results and to the type of the current picture.

According to the proposed solution, the suitable statistics resulting from the first pass are now used to encode the current picture either in the frame mode if the sequence can be considered as quasi motionless or in the field mode, at the picture level, if a significant motion has been detected with respect to the previous picture (to encode in the field mode means that the picture is de-interlaced and that the two fields constituting this picture are encoded separately and sequentially). The interest of this feature is the following: when an I or a P picture is field encoded (the intra pictures -or I pictures- are coded without any reference to other pictures, the predictive pictures- or P pictures- are coded using motion-compensated prediction from a previous I or P picture), the compression efficiency is also enhanced: the second field can be predicted with reference to the first one, which leads to have less intra blocks to encode I pictures, and to observe a better coherence between the two fields in case of P pictures.

An other object of the invention is to propose a video coder for implementing said coding method.

To this end, the invention relates to a video coder for encoding digital signals corresponding to interlaced-field picture sequences in which each picture is divided into subpictures called macroblocks, comprising a first coding sub-system for carrying out a first coding step at the macroblock level and a second coding sub-system for carrying out a second coding step at the end of which an output coded bitstream is generated, characterized in that:

(A) said first sub-system comprises a first encoding channel, which channel comprises a series arrangement of a first section for compressing interlaced data and an encoding section, and, in parallel therewith, a second encoding channel, which channel comprises a series arrangement of a second section for compressing non-interlaced data and an encoding section, a first prediction channel on the basis of output signals of said first section and, in parallel therewith, a second prediction channel on the basis of output signals of said second section, said second section including at its input side a circuit for de-interlacing the fields and said second prediction channel including a circuit for re-interlacing the fields, a decision sub-assembly comprising means for comparing the output signals of the first and second encoding channels and means for counting the number of macroblocks coded in accordance with the field mode, a computation circuit for counting the number of macroblocks that have been predicted according to the field motion compensated mode, and a processor for receiving said macroblock numbers and storing also the average quantization steps of the current and last picture;

(B) said second sub-system comprises a third encoding channel, which channel comprises a series arrangement of a third section for compressing interlaced data and an encoding section, and, in parallel therewith, a fourth encoding channel, which channel comprises a series arrangement of a fourth section for compressing non-interlaced data and an encoding section, a third prediction channel on the basis of output signals of said first section and, in parallel therewith, a fourth prediction channel on the basis of output signals of said fourth section, said fourth section including at its input side a circuit for de-interlacing the fields and said fourth prediction channel including a circuit for re-interlacing the fields, a decision sub-assembly comprising means for comparing the output signals of the first and second encoding channels and means for selecting the prediction and encoding channels in accordance with the result of said comparison, and a selection stage comprising means for connecting the pictures to be coded to the input of said second sub-system either directly or via a circuit for suppressing the field interlacing, according to the value of an output flag delivered by the processor on the basis of statistical results constituted by its input signals.

BRIEF DESCRIPTION OF THE DRAWINGS

The particularities and advantages of the invention will now be explained with reference to the embodiment described hereinafter and considered in connection with the drawings, in which.

DETAILED DESCRIPTION OF THE INVENTION

With a conventional coder, sequences that are rather still are generally well encoded. This is no longer the case when trying to code more difficult sequences with a lot of motion, flashes, sequences with a lot of scene changes, and so on. According to the video coding method here proposed, if a constant quantization step is used to encode a picture, it becomes possible to determine if some part of this picture is more difficult to encode, or not. A first coding pass is therefore carried out with such a constant quantization step, and its result is a list of statistics related to existing coding modes. The main ones, in the present case, are:

NFEM=number of field encoded macroblocks

NFMCM=number of field motion compensated macroblocks

AQSCP=average quantization step of the current P picture

AQSLP=average quantization step of the last P picture.

After having studied several relevant picture sequences coded in the field mode and in the frame mode, it is here proposed to take the decision of using during the second coding pass the frame or the field mode on the basis of the picture quality after decoding, such as estimated according to the statistical results of the first coding pass.

As seen later, the criterion for that choice is also related to the picture type, I, P, or B (the bidirectional predictive pictures, or B pictures, are coded on the basis of both previous and following I or P pictures) for each picture type, if a condition (or a specific set of conditions) is (are) valid, then the picture is encoded according to the field mode in the second coding pass, while it will be encoded according to the frame mode in the opposite case (condition(s) not valid).

Figure 1:
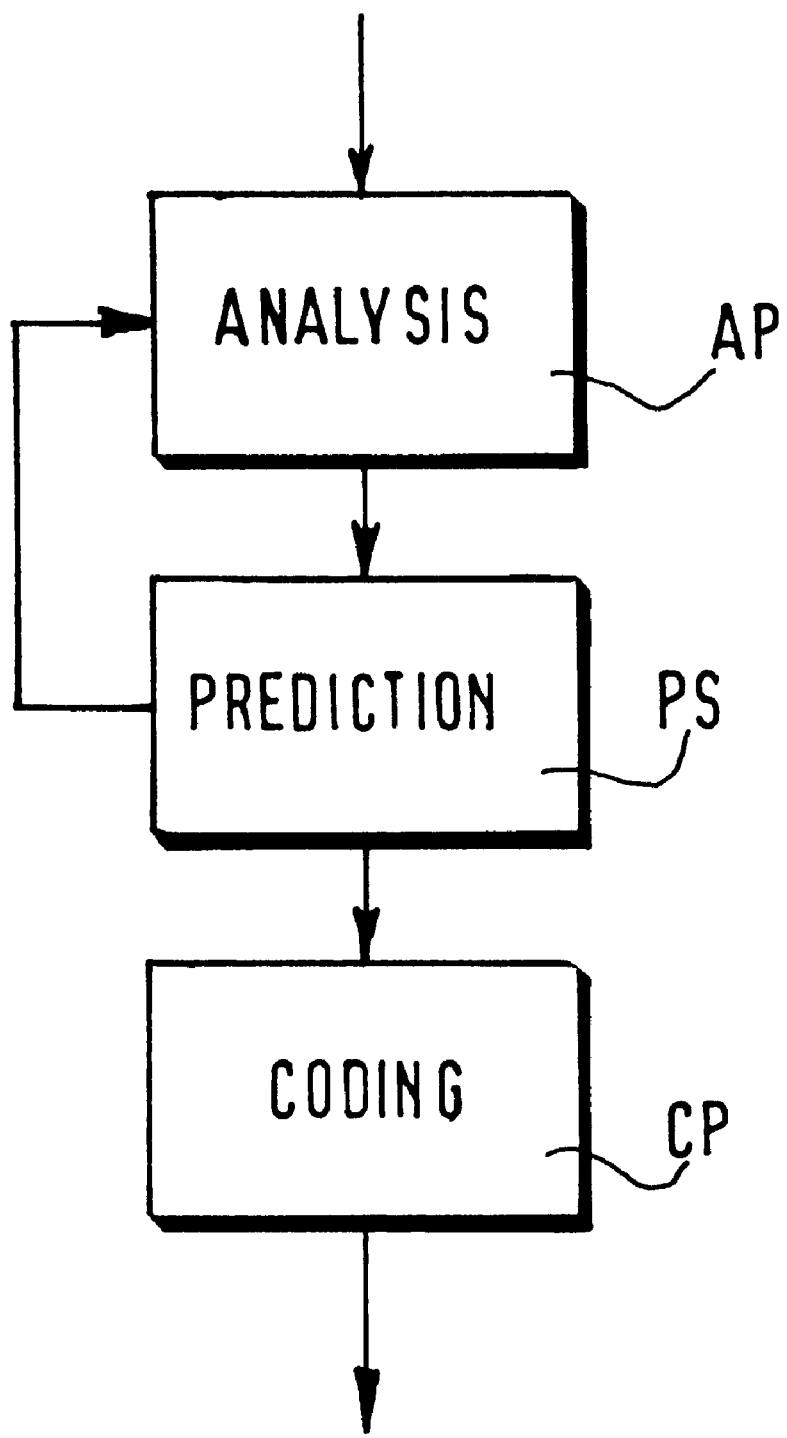
FIG. 1 illustrates very schematically a double pass video coder.
Figure 2:
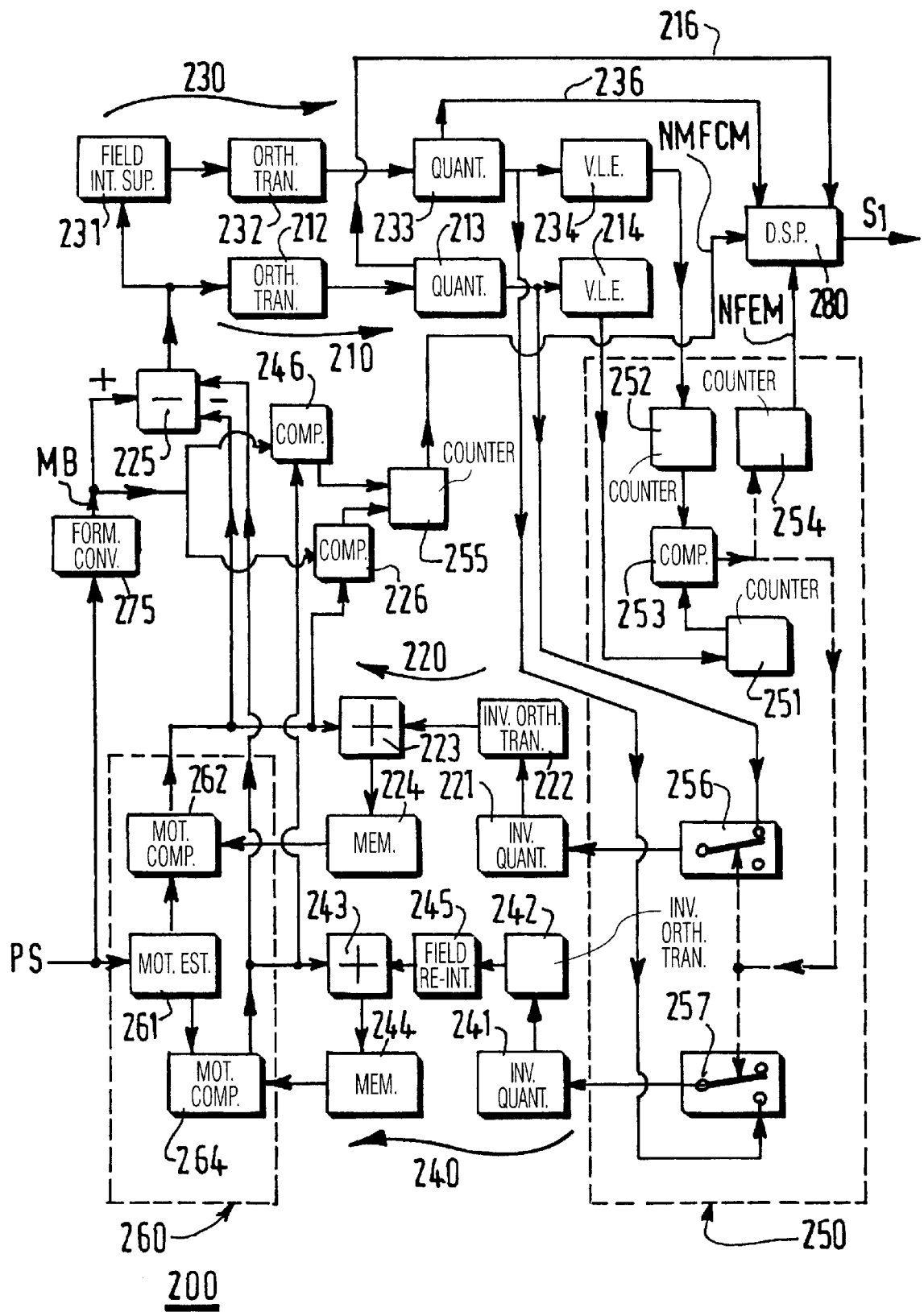
FIGS. 2 and 3, considered together, illustrate an embodiment of a video coder according to the invention.
Figure 3:
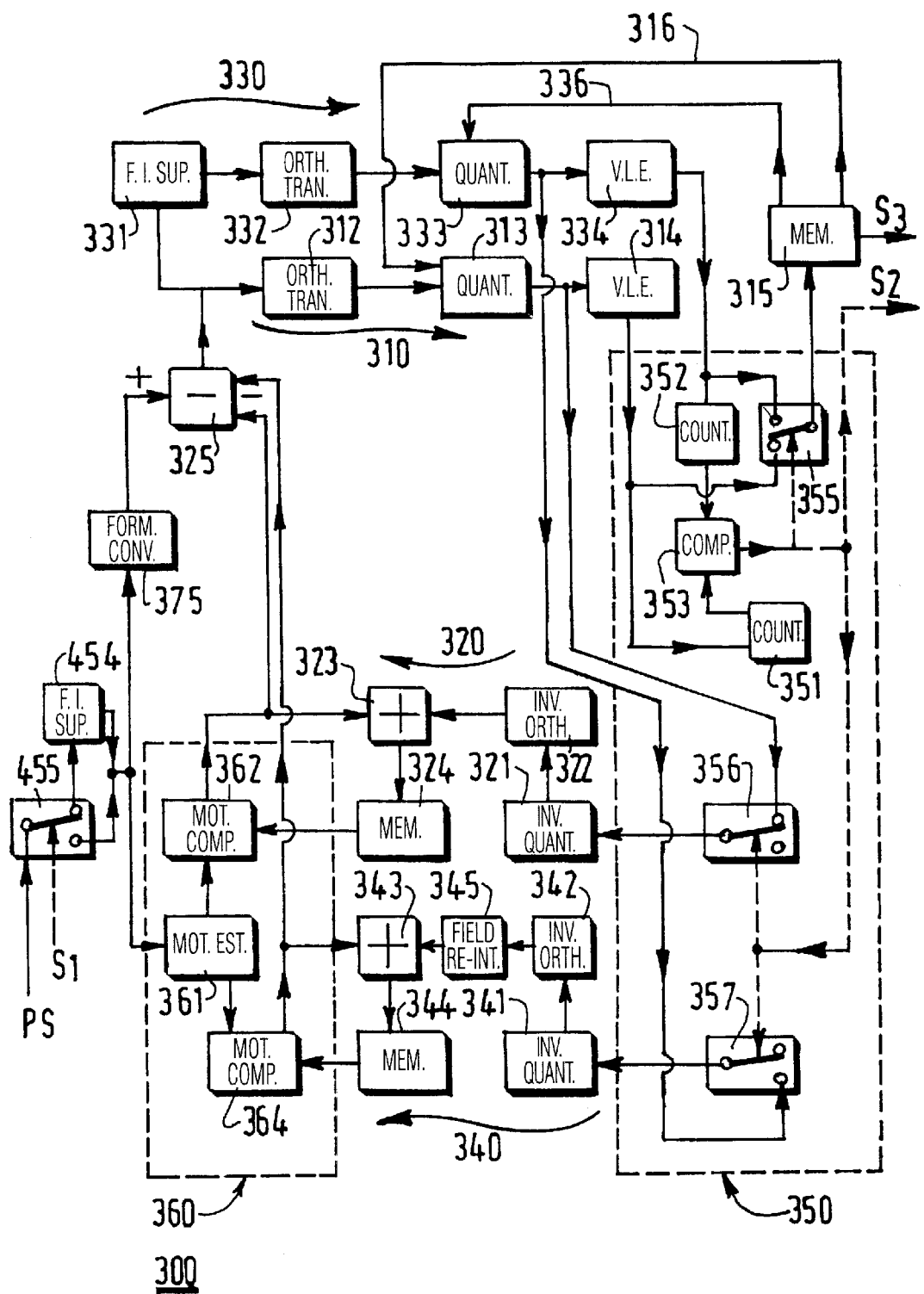

The video coder of FIGS. 2 and 3, provided for carrying out the coding method described above, comprises two coding sub-systems 200 and 300 corresponding respectively to the implementation of the first and second coding passes. These sub-systems are now described.

The sub-system 200 shown in FIG. 2, which is in charge of the first pass, comprises a first encoding channel 210, receiving the digital signals to be encoded, and an associated first prediction channel 220. The encoding channel 210 comprises a series arrangement of an orthogonal transform circuit 212 (a discrete cosine transform in this embodiment), a quantizing circuit 213 and a variable-length encoding circuit 214. The prediction channel 220, that receives the signals before encoding (quantized signals), comprises, at the output of the circuit 213, a switch 256 followed by a series arrangement of an inverse quantizing circuit 221 and an inverse orthogonal transform circuit 222 (an inverse discrete cosine transform in the present case) ensuring the respective inverse transforms of those performed by the circuits 213 and 212. The output signals of the circuit 222 are applied to a first input of an adder 223 whose output signal is stored in a picture memory 224. The output signal of the memory 224 is applied to a motion compensation stage 260 which comprises a motion estimation circuit 261 and a motion compensation circuit 262. A first input of the circuit 262 receives the output signal of the memory 224 and a second input receives that of the circuit 261.

The circuit 261 receives the digital input signals of the sub-system 200 (pictures PS) and determines, for each macroblock of the current picture, a displacement vector which is representative of the motion of said macroblock with respect to the corresponding macroblock of a picture previously transmitted for encoding (this determination is known as block matching) and is applied to the second input of the motion compensation circuit 262. The circuit 262 supplies a predicted macroblock whose difference with the preceding macroblock is determined in a subtracter 225 which is arranged upstream of the orthogonal transform circuit 212. The predicted macroblock is also applied to a second input of the adder 223. The first input of the subtracter 225 receives the output signal of a format conversion circuit 275 (i.e. each macroblock MB of the current picture) which itself receives the input signals (the pictures PS to be processed). The digital signals at the input of the circuit 212 are thus signals representing the prediction error, i.e. the difference between each original picture macroblock and the predicted macroblock which is deduced therefrom after the operations performed in the prediction channel 220, between the input of the inverse quantizing circuit 221 and the output of the motion compensation circuit 262.

The sub-system 200 of FIG. 2 also comprises a second encoding channel 230, an associated second prediction channel 240 and a decision sub-assembly 250. The second encoding channel 230, arranged in parallel with the first encoding channel 210, comprises, at the output of the subtracter 225, a series arrangement of a circuit 231 for suppressing the field interlacing, a second orthogonal transform circuit 232, a second quantizing circuit 233 and a second variable-length encoding circuit 234. Similarly as the first channel 220, the second prediction channel 240 associated with this encoding channel 230 comprises a switch 257 followed by a series arrangement of a second inverse quantizing circuit 241, a second inverse orthogonal transform circuit 242, a second adder 243, a second picture memory 244, the output of which is applied, in the motion compensation stage 260, to a second motion compensation circuit 264. The channel 240 also comprises, in series between the circuits 242 and 243, a circuit 245 for re-interlacing fields. The output of the channel 240, i.e. that of the circuit 264, supplies a predicted macroblock whose difference with the preceding macroblock is determined in the subtracter 225, and which is also applied to a second input of the adder 243. The second circuits 232, 233, 234, 241, 242, 243, 244, 264 are identical to the first circuits 212, 213, 214, 221, 222, 223, 224, 262 respectively.

The decision sub-assembly 250 comprises a first counter 251 for counting the number of bits at the output of the encoding circuit 214, a second counter 252 for counting the number of bits at the output of the encoding circuits 234 and a comparator 253 for comparing said two numbers and, according to the lower of these numbers, deciding to increase by one, or not, the content of a counter 254 of the number NFEM of macroblocks that have been coded according to the field mode.

Similarly, in each prediction channel 220 and 240, the processing of a MAE (mean absolute error) is performed in a computation circuit, 226 or 246, receiving on the one hand the output of the motion compensation circuit 262 or 264 and on the other hand the original macroblock MB available at the output of the format conversion circuit 275. For each motion compensation type, the MAE is calculated for each macroblock in the following way:

$$diff = \left( \sum_{i=1}^{16} \sum_{j=1}^{16} (Ori[i][j] - Pred[i][j]) \right) \Big/ 256$$

$$MAE = \sum_{i=1}^{16} \sum_{j=1}^{16} |Ori[i][j] - diff|$$

where ori [i][j] is a pixel of the macroblock to be coded and Pred [i][j] is a pixel of the prediction MB. The motion compensation decision consists in determining the MAE which has the lowest value. If the lowest MAE has been determined with a field vector, then the number NFMCM of macroblocks that have been predicted according to the field motion compensated mode is incremented in a counter 255.

The numbers NFEM and NFMCM are sent towards a digital signal processor 280. The quantization steps chosen in the quantizing circuits 213 and 233 are also sent towards said processor, in order to determine and store the average quantization step AQSCP of each current P-picture and the average quantization step AQSLP of the last P-picture. The statistics thus determined during the first pass allow to decide either to encode the current picture in the frame mode if the sequence is quasi-motionless, which is indicated by the first position of a flag S1 returned by the processor 280 on the basis of the obtained statistics, or, if a significant motion has been detected by comparison with the previous picture, which is indicated by the other position of said flag, to suppress the interlacing of the picture and to encode each field of this picture separately.

As indicated above, several relevant picture sequences have been encoded in both modes and then studied. This study has shown that the decision of using the frame or the field encoding structure may be the picture quality after encoding, that is correlated to the statistical results of the first pass, and may also depend on the picture type. For each picture type, if the criterion indicated in the table in valid, then the picture will be, during the second pass, encoded according to the field mode. It will be encoded according to the frame mode if the criterion is not valid. The table is the following

| PICTURE TYPE | CRITERION |
| --- | --- |
| I | IF (m × NFEM) > (n × NMIP) |
| P | IF (m × NFEM) > (n × NMIP) |
|   | OR (m × NFMCM) > n, × NMIP |
|   | OR (r × AQSCP) > (q × AQSLP) |
| B | IF (m × NFEM) > (n × NMIP) |
|   | OR (m × NFMCM) > n × NMIP | with NMIP being the number of macroblocks in the picture. In a preferred embodiment of the invention, the values of m, n, r, q are 4, 3, 10, 15 respectively.

The sub-system 300 shown in FIG. 3, which is in charge of the second pass, comprises a third encoding channel 310 and an associated third prediction channel 320. The third encoding channel 310 comprises a series arrangement of an orthogonal transform circuit 312 (a discrete cosine transform), a quantizing circuit 313, a variable-length encoding circuit 314, a buffer memory 315 delivering the output signal $S_3$ of the coder, and a return connection 316 between this memory and a second input of the circuit 313 for adjusting the quantization step and the bitrate. The third prediction channel 320, that receives the signal before encoding (quantized signals), comprises, at the output of the circuit 313, a switch 356 followed by a series arrangement of an inverse quantizing circuit 321 and an inverse orthogonal transform circuit 322 (an inverse discrete cosine transform) ensuring the respective inverse transforms of those performed by the circuits 313 and 312. The output signals of the circuit 322 are applied to a first input of an adder 323 whose output signal is stored in a picture memory 324. The output signal of the memory 324 is applied to a motion compensation stage 360 which comprises a motion estimation circuit 361 and a motion compensation circuit 362. A first input of the circuit 362 receives the output signal of the memory 324 and a second input receives that of the circuit 361. The circuit 361 receives the digital input signals of the coder (pictures PS), via a selection stage (455, 454) which is described hereinunder, and determines, for each picture macroblock, its displacement vector which is applied to the second input of the motion compensation circuit 362. The circuit 362 supplies a predicted macroblock whose difference with the preceding macroblock is determined in a subtracter 325 which is arranged upstream of the orthogonal transform circuit 312. The predicted macroblock is also applied to a second input of the adder 323. The first input of the subtracter 325 receives the output signal of a format conversion circuit 375 which itself receives, via the selection stage (455, 454), the input signals of the coder. The digital signals at the input of the circuit 312 are thus, as for the circuit 212, signals representing the prediction error, i.e. the difference between each original picture macroblock and the predicted macroblock which is deduced therefrom after the operations performed in the prediction channel 320, between the input of the inverse quantizing circuit 321 and the output of the motion compensation circuit 362.

The sub-system 300 of FIG. 3 also comprises a fourth encoding channel 330, an associated fourth prediction channel 340 and a decision sub-assembly 350. The fourth encoding channel 330, arranged in parallel with the third encoding channel 310, comprises, at the output of the subtracter 325, a series arrangement of a circuit 331 for suppressing the field interlacing, an orthogonal transform circuit 332, a quantizing circuit 323, a variable-length encoding circuit 334, the buffer memory 315 and a return connection 336 between said memory and a second input of the circuit 333 for adjusting the quantization step and the bitrate. Similarly, as the third channel 320, the fourth prediction channel 340 associated with this encoding channel 330 comprises a switch 357 followed by a series arrangement of inverse quantizing circuit 341, an inverse orthogonal transform circuit 342, an adder 343, a picture memory 344, the output of which is applied, in the motion compensation stage 360, to a motion compensation circuit 364. The channel 340 also comprises, in series between the circuits 342 and 343, a circuit 345 for re-interlacing fields. The output of the channel 340, i.e. that of the circuit 364, supplies a predicted macroblock whose difference with the preceding macroblock is determined in the subtracter 325, and which is also applied to a second input of the adder 343. The circuits 332. 333,334, 341, 342, 343, 344, 364 are identical to the circuits 312, 313, 314, 321, 322, 323, 324, 362 respectively.

The decision sub-assembly 350 comprises a first counter 351 for counting the number of bits at the output of the encoding circuit 314, a second counter 352 for counting the number of bits at the output of the encoding circuit 334, and a comparator 353 for comparing these two numbers. A second selection stage, controlled by the output signal of the comparator 353, comprises a first switch 355 whose non-common terminals are connected to the outputs of the two encoding circuits 314 and 334 respectively, and whose common terminal is connected on the one hand to the input of the buffer memory 315 for applying the output signal of one of these circuits 314 and 324 to said buffer memory, and on the other hand to the first and second switches 356 and 357 for connecting or not connecting each prediction channel at the output of the quantizing circuit of the associated encoding channel. A signal S2 (constituted by a single bit in this case) is supplied by the decision sub-assembly 350 so as to be applied, after transmission, to a decoding device (not described hereinafter, since it is out of the scope of the invention) and to indicate whether the lines of the macroblock under consideration have been de-interlaced or not.

The selection stage, provided at the input of the subsystem 300 carrying out the second pass, comprises a switch 455 whose common terminal receives the input signals of the coder (pictures PS) and whose non-common terminals are connected, for the first one, directly to the inputs of the format conversion circuit 375 and the motion estimation circuit 261 and, for the second one, to the same inputs of these two circuits 375 and 361 but via a circuit 454 for suppressing the field interlacing of the picture. The switch 455 is controlled by a flag constituted by the output signal $S_1$ of the processor 280. If this flag $S_1$ 0, i.e. corresponds to the situation according to which the picture sequence can be considered as quasi-motionless, the position of the switch 455 corresponds to the direct connection to the circuits 375 and 361. Conversely, if the flag $S_1=1$, i.e. corresponds to the situation in which a significant motion has been detected, the circuit 454 allows to suppress the interlacing of the pictures PS before these pictures are sent towards the circuits 375 and 361. In the latter situation, as the pictures are no longer interlaced, the coding step will take place only in the coding branch 310.

In another embodiment of the coder according to the invention, it is also possible to take into account the existing of the double pass encoding process for detecting scene changes and thus obtaining a further picture quality improvement. Indeed, if it is assumed that within a sequence the complexity of the pictures is more or less constant, depending on the picture type, it can be expected to detect scene changes within the input sequence by analyzing the results of encoding with a constant quantisation step. The restriction of this scene change detection is that it is applied to I and P pictures only, because of the reordering of the pictures.

The case of the detection onto P pictures will be first described. In order to apply the scene change detection operation on any P picture, a storing step of the past two P pictures is needed. The parameters of detection are the following:

NbIntra, the number of macroblocks intra encoded for the current picture.

NbIntraPrev, the number of macroblocks intra encoded in the first pass of the previous P picture;

NbIntraPrev2, the number of macroblocks intra encoded in the first pass of the ante previous P picture;

SumIntra=NbIntraPrev+NbIntraPrev2;

NbBits, LastNbBits, the numbers of bits used in the first pass of current and previous P pictures;

X1p, LastX1p, the resulting complexity of the current P picture and the last P picture respectively, at the end of the first pass;

NbNomc, the number of macroblocks encoded without motion compensation;

Nbmc, the number of macroblocks encoded with motion compensation;

NbMb, the number of macroblocks in the picture.

It will also be noted that:

if M=1, the algorithm is not applied on the 2 P pictures following an I picture, to avoid too much I pictures and consequently an impairment of the image quality;

the algorithm is not applied on the P picture following an I picture in certain conditions The algorithm is the following:

If (10*NbBits>=4*ThresBits*LastNbBits)

and (10*X1p>=4*ThresX*LastX1p)

and (10*NbNomc<7NbMb)

and (10*Nbmc<7*NbMb)

there is a scene change

Else If (20*NbIntra>=Thres1*SumIntra) and (10*NbIntra>=4*NbMb)

there is a scene change

Else If (20*NbIntra>=Thres2*SumIntra) and (10*NbIntra>=35*NbMb)

there is a scene change

Else If (10*NbIntra>=9*NbMb there is a scene change

Else If (10*NbBits>=ThresBits*LastNbBits)

and (10*X1p>=ThresX*LastX1p)

and (10*NbIntra>=4*NbMb)

there is a scene change with
 thres1=17
 thres2=30
 thresX=15
 thresBits=20
(the definition of the thresholds, based on the study of several sequences, is empirical).

The case of the detection onto I pictures is now described. As a scene change on P picture is detected by referring to the results of previous P pictures, false detection could occur when consecutive P pictures are separated by an I picture. That is why it is needed to detect if a scene change has occurred onto the I picture or not. A scene change onto an I picture can easily be detected by studying the prediction modes (interpolated, forward, backward) of the previous B frames (that are coded just after the I picture). If there are very few interpolated predictions and if one of the forward or the backward prediction is far more used than the other on both B frames, it means that there is a scene change on one of these three images. Thus, if for the B picture(s) following an I picture (in the encoding order), one has:

(100*TtBidir<15*NbMb) and ((TtForw>10*TtBack) or (TtBack>10*TtForw))

in which:

TtBidir is the number of macroblocks encoded with a bidirectional prediction

TtForw is the number of macroblocks encoded with a forward prediction

TtBack is the number of macroblocks encoded with a backward prediction then, there is a scene change detection on the I picture. The algorithm of scene cut detection will not be applied to the first P picture following the I picture, but, instead, for the first P picture following the I picture, the statistics of detection will be updated, as illustrated in this example where a scene change occurs on picture 9:

| Input order: | B5 | B6 | P7 | B8 | B9 | I10 | B11 | B12 | P13 ... |
|---|---|---|---|---|---|---|---|---|---|
| Encoding order: | P7 | B5 | B6 | I10 | B8 | B9 | P13 | B11 | B12 ... |

In that case, it may be understood that, for the B8 picture, the most of the predictions will refer to the picture P7. while for the B9 picture they will make reference to the picture I10. This can be deduced from the statistical results derived from the first encoding pass.

What is claimed is:

1. A video coder for encoding digital signals corresponding to interlaced-field picture sequences in which each picture is divided into subpictures called macroblocks, comprising a first coding sub-system for carrying out a first coding step at the macroblock level and a second coding sub-system for carrying out a second coding step at the end of which an output coded bitstream is generated, characterized in that:

(A) said first sub-system comprises a first encoding channel, which channel comprises a series arrangement of a first section for compressing interlaced data and an encoding section, and, in parallel therewith, a second encoding channel, which channel comprises a series arrangement of a second section for compressing non-interlaced data and an encoding section, a first prediction channel on the basis of output signals of said first section and, in parallel therewith, a second prediction channel on the basis of output signals of said second section, said second section including at its input side a circuit for de-interlacing the fields and said second prediction channel including a circuit for re-interlacing the fields, a decision sub-assembly comprising means for comparing the output signals of the first and second encoding channels and means for counting the number of macroblocks coded in accordance with the field mode, a computation circuit for counting the number of macroblocks that have been predicted according to the field motion compensated mode, and a processor for receiving said macroblock numbers and storing also the average quantization steps of the current and last picture;

(B) said second sub-system comprises a third encoding channel, which channel comprises a series arrangement of a third section for compressing interlaced data and an encoding section, and, in parallel therewith, a fourth encoding channel, which channel comprises a series arrangement of a fourth section for compressing non-interlaced data and an encoding section, a third prediction channel on the basis of output signals of said first section and, in parallel therewith, a fourth prediction channel on the basis of output signals of said fourth section, said fourth section including at its input side a circuit for de-interlacing the fields and said fourth prediction channel including a circuit for re-interlacing the fields, a decision sub-assembly comprising means for comparing the output signals of the first and second encoding channels and means for selecting the prediction and encoding channels in accordance with the result of said comparison, and a selection stage comprising means for connecting the pictures to be coded to the input of said second sub-system either directly or via a circuit for suppressing the field interlacing, according to the value of an output flag delivered by the processor on the basis of statistical results constituted by its input signals.

* * * * *